United States Patent
Tsuchie et al.

(10) Patent No.: US 7,993,467 B2
(45) Date of Patent: Aug. 9, 2011

(54) APPARATUS FOR REMOVING MATTE-STICKING AND METHOD FOR USING THE APPARATUS

(75) Inventors: Yasuhiro Tsuchie, Tamano (JP); Masahiro Wakayama, Tamano (JP); Akira Yamashita, Tamano (JP)

(73) Assignee: Pan Pacific Copper Co., Ltd., Tokyo (JP)

( * ) Notice: Subject to any disclaimer, the term of this patent is extended or adjusted under 35 U.S.C. 154(b) by 503 days.

(21) Appl. No.: 12/206,682

(22) Filed: Sep. 8, 2008

(65) Prior Publication Data
US 2009/0084401 A1   Apr. 2, 2009

(30) Foreign Application Priority Data
Sep. 28, 2007   (JP) ................. 2007-255296

(51) Int. Cl.
*B08B 7/00*   (2006.01)

(52) U.S. Cl. ......... 134/6; 134/8; 134/9; 134/15; 134/18; 134/19; 134/22.1; 134/32; 134/34; 134/42; 15/93.2; 15/104.068; 15/26; 15/249.2; 266/135

(58) Field of Classification Search ................. 134/8, 9, 134/15, 18, 19, 22.1, 32, 34, 42; 15/93.2, 15/104.068, 26, 249.2; 266/135
See application file for complete search history.

(56) References Cited

U.S. PATENT DOCUMENTS
2009/0084401 A1 * 4/2009 Tsuchie et al. .................... 134/6

FOREIGN PATENT DOCUMENTS
JP   08-159663   *   6/1996
JP   2008106173 A   *   5/2008
* cited by examiner Primary Examiner — Sharidan Carrillo
(74) Attorney, Agent, or Firm — Leighton K. Chong

(57) ABSTRACT

An apparatus and method are provided to remove matte-sticking adhered to an inner surface of an inclined rear jacket of an exhaust gas hood for collecting exhaust gas discharged during the converter operation in copper smelting. Scraping means 10a~10f are each provided with a scraping part 20 for scraping off matte-sticking by moving slidably across the inner surface of the rear jacket 8 by driving means 11 from a sidewall of the exhaust gas hood to at least over the centerline L of the width of the rear jacket 8. The scraping means are arranged in pairs at both right and left sidewalls of the exhaust gas hood 6 in multiple levels along the inclination of the rear jacket 8, thereby allowing the matte-sticking adhered to the rear jacket 8 to be removed over almost its entire surface.

4 Claims, 5 Drawing Sheets

APPARATUS FOR REMOVING MATTE-STICKING AND METHOD FOR USING THE APPARATUS

FIELD OF THE INVENTION

The present invention relates to an apparatus for removing matte-sticking in the operation of a smelting furnace and a method for using the apparatus, and in particular, relates to an apparatus for removing matte-sticking adhered to an inner surface of an inclined rear jacket provided to an exhaust gas hood for collecting exhaust gas discharged from a converter and a method for using the apparatus.

BACKGROUND OF THE INVENTION

The overall process for copper smelting is well-known, for example, as described in JP Patent Publication Heisei 11-256250, JP Patent Publication Heisei 11-335750, and JP Patent Publication Heisei 11-335751. Smelting of copper is performed for example by charging concentrate melted in a smelting furnace such as flash furnace to a converter, removing Fe and S from the concentrate to produce crude copper of copper grade 98-99% by blowing in air or oxygen enriched air to the converter from a plurality of tuyeres arranged at the lower part of the sidewall of the converter and finally refining the copper by electrolytic refining in an electrolysis solution to obtain electrolytic copper of copper grade over 99.99%. The converter employed in this process is provided with a so-called PS converter (Pierce Smith converter) which is a furnace body in a shape of a transversely-situated cylinder configured to incline back and forth by an electric motor to facilitate charging and draining of the concentrate and as already explained above, it is also provided with a couple dozen of tuyeres for blowing in air or oxygen-enriched air.

The PS converter is operated in batches and matte necessary for each batch is carried down by ladle from the smelting furnace in the preceding process. One batch amount of matte charged to the converter is then blown within the converter. In this blowing process, there are 2 refining stages, slag-making operation and copper-making operation. The slag-making operation is a process of removing Fe and S in the matte by oxidation, in which oxidized S is discharged with exhaust gas as $SO_2$ gas while FeO having higher melting point is removed by charging silicate ore consisting primarily of $SiO_2$ into the furnace so that it binds with FeO to produce slag with lower melting point, and then discharged from the furnace after the completion of the first slag-making operation.

The solution within the furnace decreases when the slag is discharged from the furnace after the completion of the first slag-making operation, so an additional amount of matte is charged to the furnace to carry out the second slag-making operation. Conventionally, the slag-making operation is repeated twice in general particularly when the matte produced in the smelting furnace is around copper grade 60%. The solution after discharging the slag from the furnace after the first slag-making operation is called "white metal" having a copper grade of about 75% consisting mainly of $Cu_2S$ apart from a slight remaining amount of Fe. After the slag-making operation is the copper-making operation in which S in $Cu_2S$ is removed by oxidation to finally produce crude copper having a copper grade of about 98-99%.

Since 7~12% of $SO_2$ is included in the exhaust gas generated during the operation of the PS converter, an exhaust gas hood is provided to prevent the gas from leaking outside while the gas is collected by an aspirator to produce sulfuric acid. However, the inner surface of the jacket of the exhaust gas hood disposed near a charging and discharging hole of the PS converter is more likely to be attached with matte-sticking, so-called "beko" in Japanese, which is formed by aggregation and solidification of components such as $Cu_2S$, FeS and FeO included in the exhaust gas. This may hinder the operation since the matte-sticking may gradually grow bigger with the operation and cause it to block the gas flue and suddenly fall off. The matte-sticking is more likely to be formed on the surface of the rear jacket of the exhaust gas hood near the charging and discharging hole of the PS converter, and much time was required to remove the matte-sticking. Accordingly, an apparatus for mechanically removing such matte-sticking has been proposed in JP Patent Publication Heisei 8-159663.

Matte-sticking growing bigger with the slag-making operation not only interferes with the operation by blocking the gas flue but also hinders the operation by suddenly falling off from the surface due to the inclined configuration of the rear jacket, and bumping into other facilities to cause further damages. Hence it is necessary to reliably scrape and remove the matte-sticking before it grows big as to fall off spontaneously. Conventionally, removal of matte-sticking formed on the gas flue was done by hand, but since this required long hours of operation suspension, an improvement is called for.

Apparatuses to remove matte-sticking mechanically have been proposed such as in the references above, but in the case of operation in converters, the matte-sticking accumulated to the inclined and broad surface of the rear jacket should be removed over almost its entire surface. Hence, an apparatus which can regularly as well as simply and safely remove the matte-sticking has been needed.

SUMMARY OF THE INVENTION

Therefore, it is an object of the present invention to provide a matte-sticking removing apparatus to simply and safely remove the matte-sticking adhered to the inner surface of the inclined rear jacket in the exhaust gas hood for collecting exhaust gas discharged during the operation of a converter in copper smelting.

In order to achieve the above mentioned object, the present invention provides an apparatus for removing matte-sticking by scraping off matte-sticking adhered to an inner surface of an inclined rear jacket of an exhaust gas hood for collecting exhaust gas discharged from a converter, said apparatus having scraping means arranged in pairs, each provided with a scraping part for scraping off matte-sticking by moving slidably across the inner surface of said rear jacket by a driving means from a sidewall of said exhaust gas hood to at least over the centerline of the width of said rear jacket, said scraping means being arranged in pairs at right and left sidewalls of said exhaust gas hood in multiple levels along the inclination of said rear jacket, thereby allowing the matte-sticking adhered to said rear jacket to be removed over almost its entire surface.

The present invention is further characterized wherein each of said scraping means is comprised of a shaft connected to said driving means and a scraping part provided to one end of said shaft, said scraping part being formed in the shape of a shovel with a backboard retained to said shaft, a base plate arranged so as to protrude forward from said backboard and one or more auxiliary plates arranged diagonally in between said backboard and base plate, said base plate being provided with indentations on its lower surface surface.

The present invention further encompasses a method for using the apparatus for removing matte-sticking comprising the steps of:

moving the scraping means at the right or left side of the pair located at a bottom level by said driving means from a sidewall of said exhaust gas hood to at least over the centerline of the width of said rear jacket to scrape off matte-sticking adhered to the inner surface of said rear jacket, and returning it to the original position thereafter;

operating the scraping means at the opposite side of the one moved in the preceding step in a similar manner by said driving means; and operating the scraping means at the right or left side of the pair arranged at one level above the bottom level, operating the opposite side of said scraping means by driving means thereafter and repeating the above steps until scraping means at a top level is operated.

The present invention is further characterized by a method for using the apparatus for removing matte-sticking wherein scraped matte-sticking is dropped to the bottom floor, and the dropped matte-sticking is recovered by a recovery means.

EFFECT OF THE PRESENT INVENTION

According to the apparatus for removing matte-sticking and method for using the apparatus of the present invention, it is possible to remove even the matte-sticking adhered to the inclined and broad surfaced rear jacket almost entirely in a simple and safe manner by having scraping means provided with scraping parts for scraping off matte-sticking by moving slidably across the inner surface of the rear jacket from the sidewalls of the exhaust gas hood to at least over the centerline of the width of the rear jacket and arranged in pairs at the right and left sidewalls of the exhaust gas hood in multiple levels along the inclination of the rear jacket.

Furthermore, according to the apparatus for removing matt-sticking and method for using the apparatus of the present invention, the matte-sticking adhered to the inclined rear jacket is removed in the order from the bottom to the top, and thereby the matte-sticking can be removed more effectively.

The apparatus for removing matte-sticking and the method for using the apparatus is explained in detail hereinbelow with reference to the attached drawings.

DETAILED DESCRIPTION OF INVENTION

Figure 1:
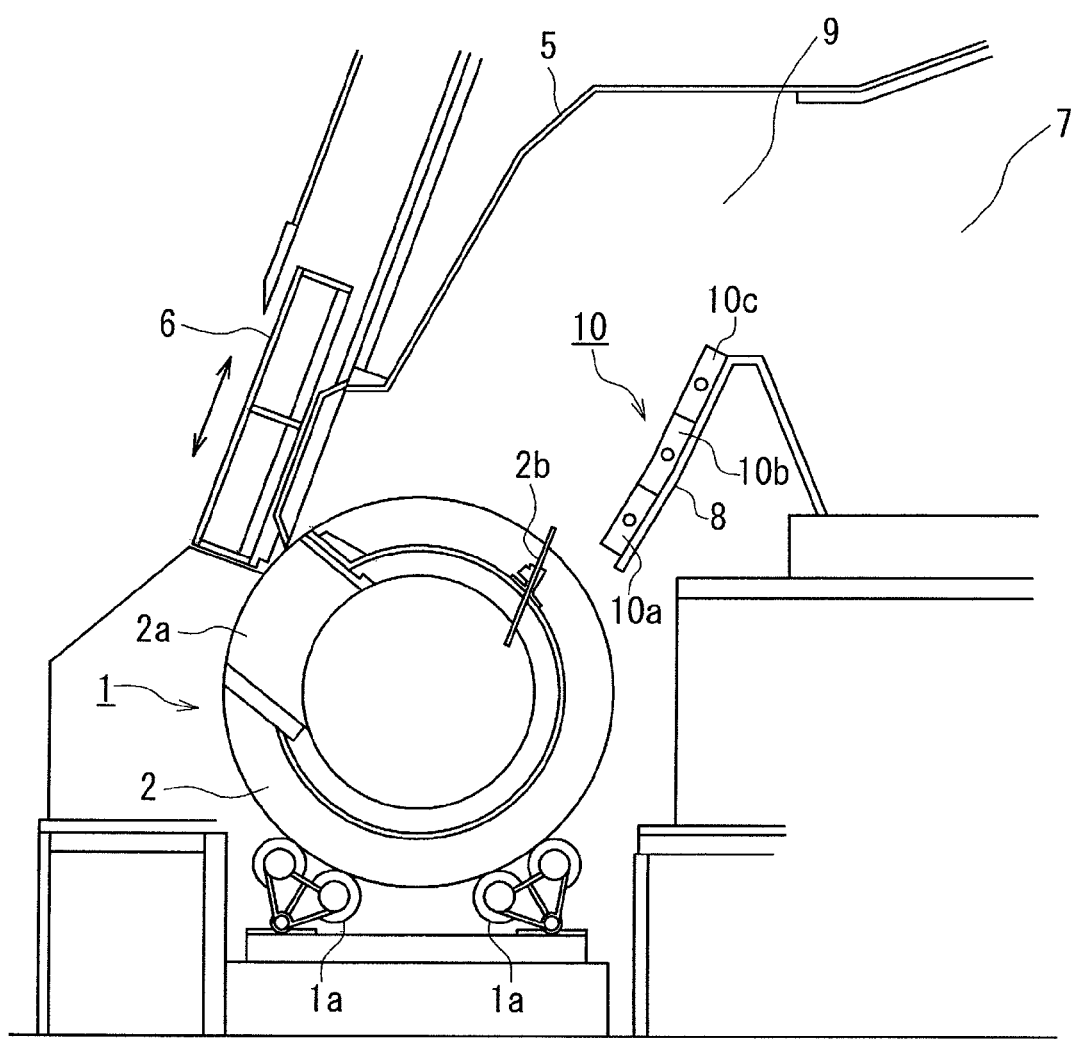
FIG. 1 is a side view of the converter equipment provided with one of the embodiments of the apparatus for removing matte-sticking according to the present invention.

In the following description, the parts referenced by numerals in the drawings are as follows:
1. PS converter
1a. roller
2. furnace body
2a. charging/discharging hole
5. exhaust gas hood
6. front hood
7. exhaust heat boiler
8. rear jacket
9. gas flue
10. apparatus for removing matte-sticking
10a-10f. scraping device/means
11. hydraulic cylinder
15. shaft
20. scraping part
21. backboard
23. base plate
25. auxiliary plate
29. groove
30. matte-sticking Referring to FIG. 1, an overall configuration of the converter facility will be explained. A PS converter 1 is provided with a furnace body 2 in a shape of approximately transversely-situated cylinder having a charging/discharging hole 2a at its top surface. The inner surface of the furnace body 2 is covered with refractory such as magnesite or chrome-magnesite bricks. Rollers 1a, 1a rotated by electric motor (not illustrated) are arranged so as to contact the sidewall of the furnace body 2, allowing the furnace body 2 to be rotated in a tilted manner. Matte, cold charge and such are charged and slag, copper and such are discharged to and from the furnace by tilting the furnace body 2 with such tilted configuration. In addition, a plurality of tuyeres are provided at the lower part of the sidewall of the furnace body 2, and oxygen or oxygen enriched air is blown directly into the matte from the tuyeres.

An exhaust gas hood 5 is installed above the PS converter. Arranged in front of the exhaust gas hood 5 is a front hood 6 which opens and closes as it slides along the exhaust gas hood 5. Opposite the front hood 6 is a rear jacket 8 which is configured with a surface inclined towards the PS converter 1. During the copper smelting operation, the furnace body 2 is rotated so that the charging/discharging hole 2a of the furnace body 2 comes in a position to face the inside of the exhaust gas hood 5, and the front hood 6 is closed to send the gas generated within the furnace to a waste heat boiler 7 via a gas flue 9 formed within the exhaust gas hood 5. The exhaust gas collected in the process is transferred to a sulfuric acid plant (not illustrated) from the exhaust gas hood 5 via the waste heat boiler 7 to be used to manufacture sulfuric acid.

Figure 2:
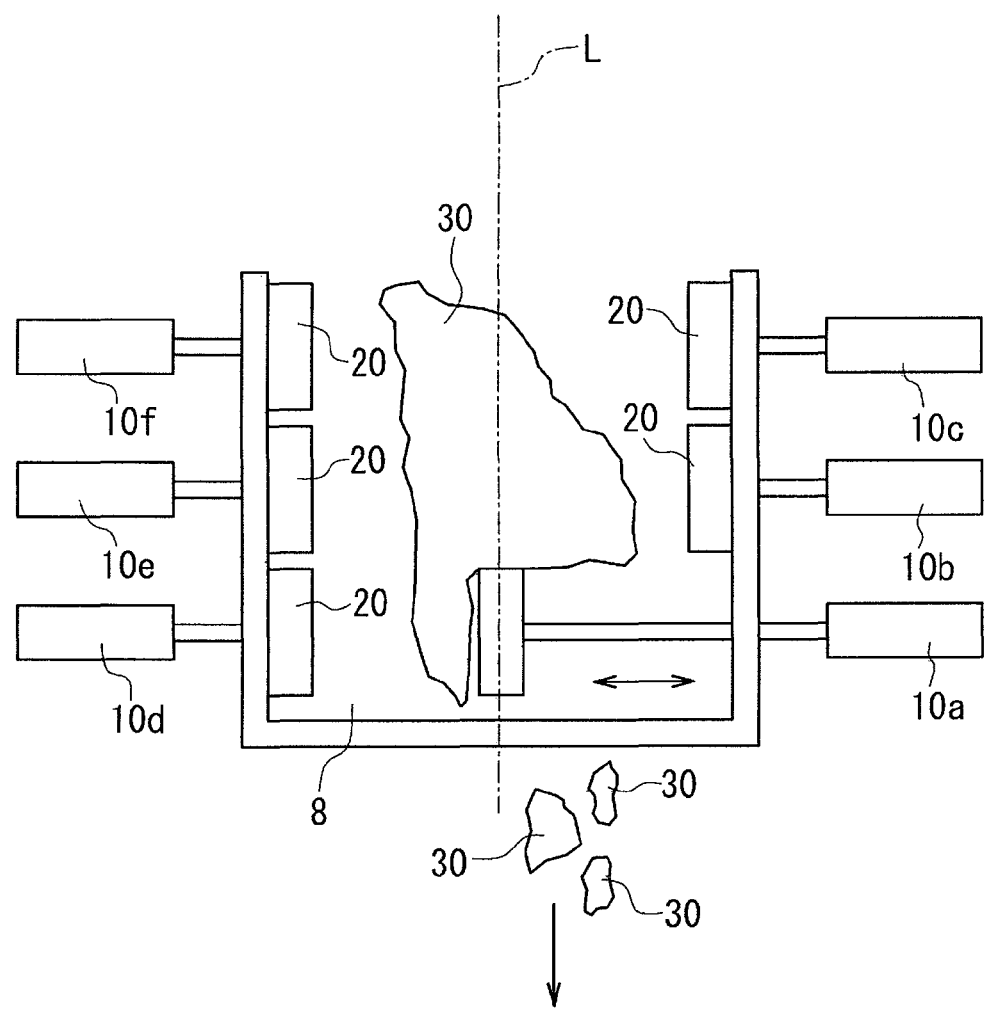
FIG. 2 is an explanatory drawing illustrating respective scraping devices comprising the apparatus for removing matte-sticking.

As shown in FIG. 2, matte-sticking 30 tends to adhere particularly to the inner surface of the rear jacket 8 as it is located near the charging/discharging hole 2a during the operation of the converter. Therefore an apparatus 10 for removing matte-sticking according to the present invention is comprised of a plurality of scraping means 10a-10f arranged in pairs on both sides under the exhaust gas hood 5 in multiple levels along the inclination of the rear jacket 8 so as to move slidably across the inner surface of the rear jacket 8. Cooling water is introduced within the rear jacket 8 to prevent adherence of the matte-sticking 30 by cooling its surface, but it is difficult to fully control the adherence of the matte-sticking 30 thereby. As illustrated in FIG. 2, in the present embodiment, a number (such as the 3 shown) of scraping devices 10a, 10b, 10c are arranged respectively from the bottom to the top along the inclination of the rear jacket 8 at the right hand side of the jacket 8 when viewed from the front of the exhaust gas hood 5. On the opposite side thereof (i.e. on the left hand side when viewed from the front of the exhaust gas hood 5), 3 scraping devices 10d, 10e, 10f are arranged respectively from the bottom to the top along the inclination of the rear jacket 8 so as to form pairs with the scraping devices 10a, 10b, 10c. The respective devices are configured to scrape off matte-sticking across almost the entire surface of the rear jacket 8 with respective scraping parts 20 which will be explained later. Features of the scraping devices 10a-10f comprising the apparatus 10 for removing matte-sticking will be explained hereinbelow.

Figure 3:
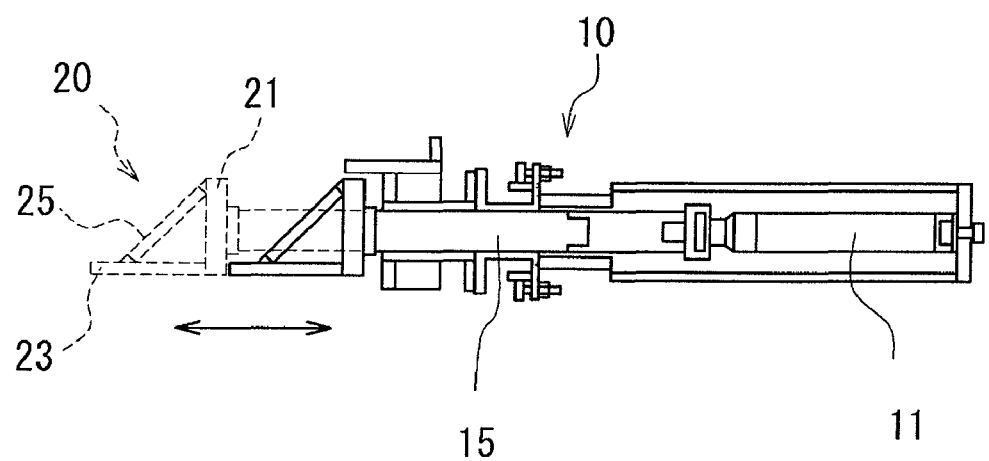
FIG. 3 is a cross sectional drawing illustrating the composition of the scraping device.

Since the scraping devices 10a-10f of the present embodiment are configured more or less the same, further explanation will be made referring to the scraping device 10a. As illustrated in FIG. 3, the scraping device 10a is comprised of a hydraulic cylinder 11 as a driving means, a shaft 15 connected to the hydraulic cylinder 11 and a scraping part 20 attached to one end of the shaft 15. The shaft 15 is moved back and forth with a motion of the hydraulic cylinder 11, by which the scraping part 20 attached to the end of the shaft 15 is slid across the surface of the rear jacket 8 to scrape off the matte sticking 30 adhered to the inner surface of the rear jacket 8. Furthermore, as illustrated in FIG. 2, the scraping part 20 of the scraping device 10a is configured to move slidably across the inner surface of the rear jacket 9 from the end of the sidewalls of the exhaust gas hood 5 to at least over the centerline L of the width of the rear jacket 8. The other scraping devices 10b-10f are configured to operate in the same manner. In the present embodiment, the hydraulic cylinder 11 is used as a driving means, but it should not be limited thereto, and other driving means such as electric motor can also be used.

Figure 4:
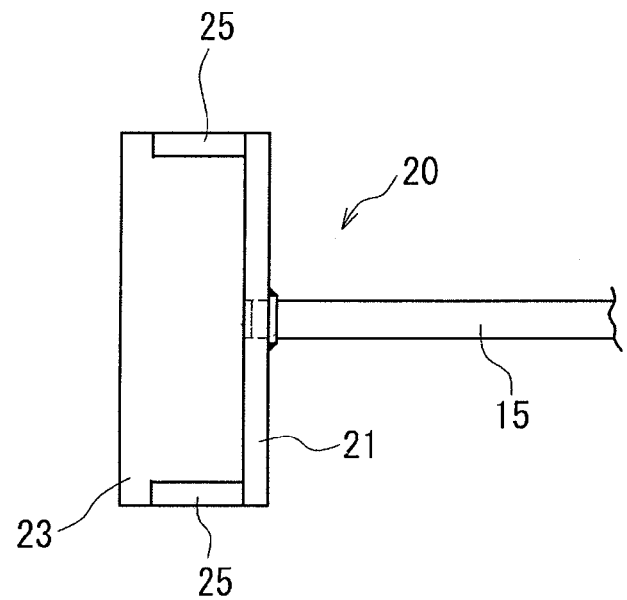
FIG. 4 (a) is a plane view (b) is a cross sectional side view and (c) is a bottom view of the scraping device.
Figure 4:
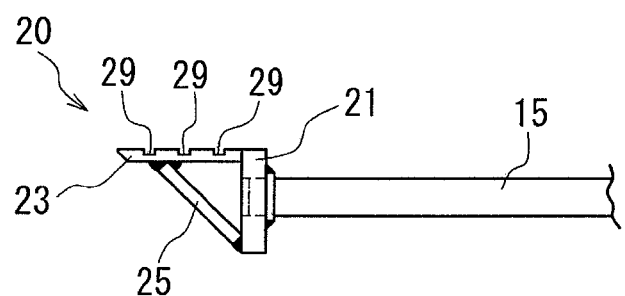
Figure 4:
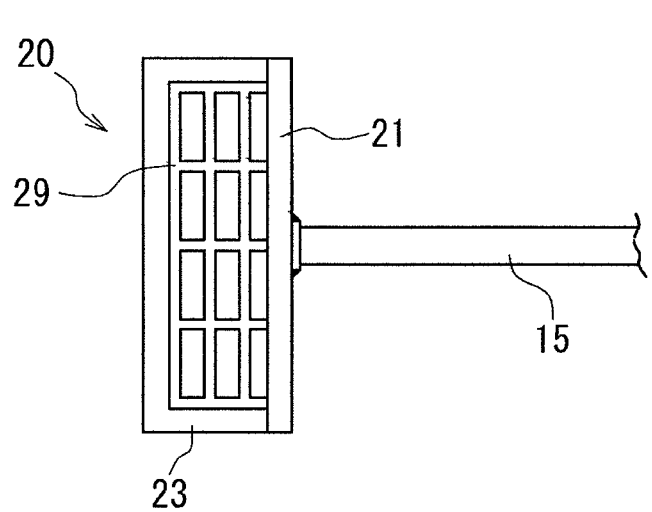

As illustrated in FIG. 4 (a)~(c), the scraping part 20 is attached to one end of the shaft 15 of the hydraulic cylinder 11, and formed in the shape of a shovel with a backboard 21 retained to the shaft 15, a base plate 23 arranged to protrude forward (at right angle) from the backboard 21 and auxiliary plates arranged diagonally at right and left side in between the backboard 21 and the base plate 23. Further, the base plate 23 is provided with a plurality of grooves 29 running vertically and horizontally, and thereby the surface of the base plate 23 is formed with indentations. By having indentations formed on the bottom surface of the base plate 23 which comes face to face with the inner surface of the rear jacket 8, the scraping of matte-sticking 30 adhered to the rear jacket 8 can be facilitated. Configuration of the surface of the base plate 23 is not limited only to the indentations as explained above, and it is also possible to provide small spike-like protrusions on the bottom surface instead.

In the present embodiment, the scraping devices 10a-10f each provided with the scraping part 20 of similar shape are arranged in pairs at right and left side in 3 levels along the inclination of the rear jacket 8, but the width of the scraping parts 20 can be altered appropriately according to the position of the respective scraping devices 10a~10f. For example, it becomes possible to scrape off a larger area by broadening the width of the scraping part 20, but the load on the hydraulic cylinder 11 during the scraping operation would become heavier. Hence, scraping can be more effectively conducted by providing a scraping part 20 with smaller width where more matte-sticking 30 is likely to adhere or where it tends to harden, to lessen the load on the hydraulic cylinder 11. Furthermore, it is possible to configure the scraping parts 20 in a plane shape, or even in different shapes to be combined and disposed appropriately.

Figure 5:
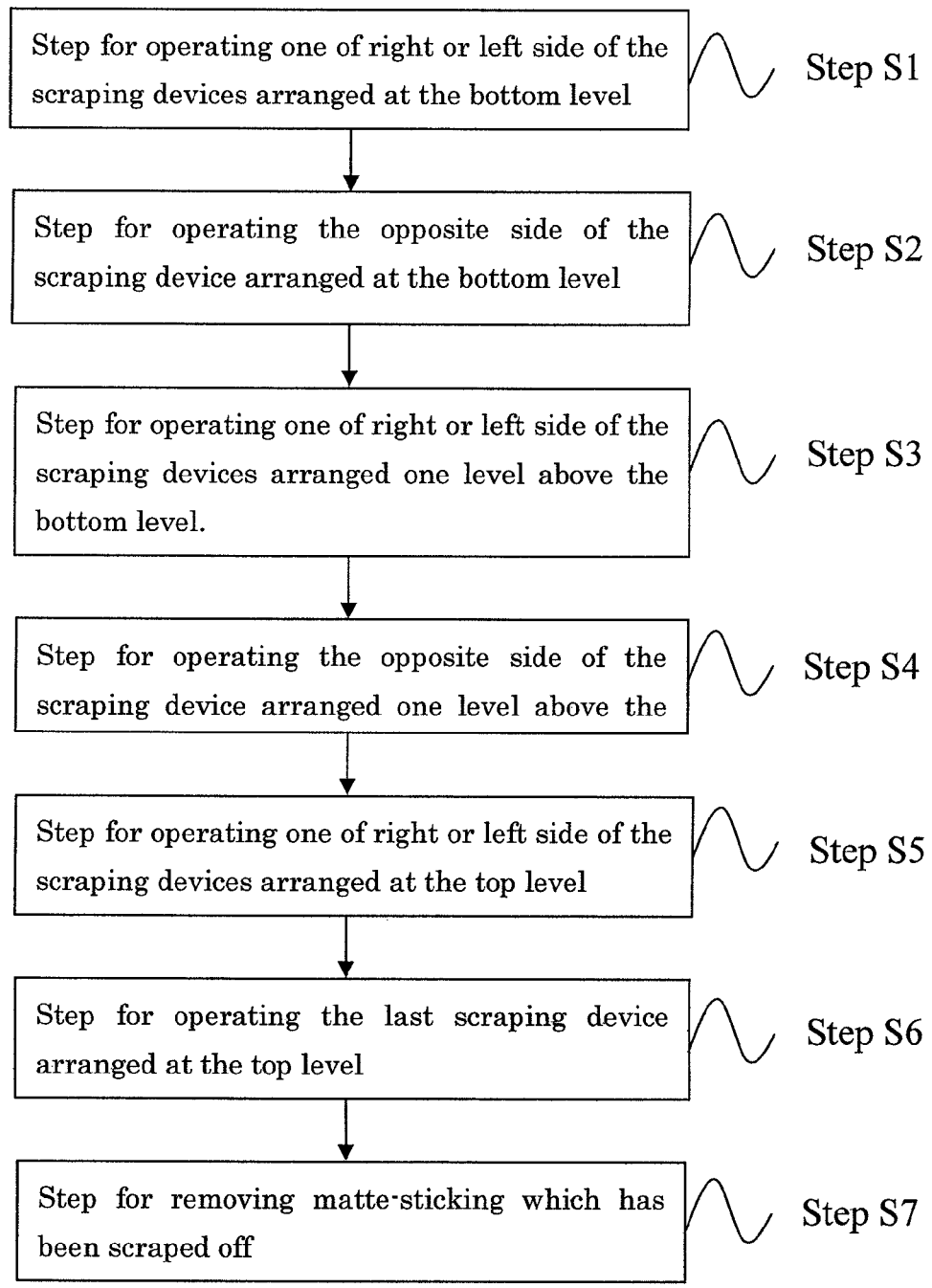
FIG. 5 is a flow chart illustrating one of the embodiments of the method for using the apparatus for removing matte-sticking according to the present invention.

Next, a method for using the apparatus of the present invention for removing matte-sticking will be explained along with the operation of the above explained apparatus 10 for removing matte-sticking. FIG. 5 is a flowchart showing one of the embodiments of the method for using the apparatus of the present invention for removing matte-sticking.

As illustrated in FIG. 2, the scraping devices 10a~10f are provided in pairs at right and left sidewalls of the exhaust gas hood 5. First of all, one of the right or left side of the scraping devices at the bottom level is operated to move the scraping part 20 from the sidewall of the exhaust gas hood 5 to at least over the centerline L of the width of the rear jacket 8 to scrape off the matte-sticking 30. It does not matter which of the 2 scraping devices 10a or 10d to be operated first, but in the case of present embodiment, the scraping device 10a at the right hand side is operated first. After scraping off the matte-sticking 30, the scraping part 20 is moved back to the original position to the sidewall of the exhaust gas hood 5 (step S1).

Next, the scraping device 10d at the opposite side of the one operated in the preceding step is operated to scrape off the matte-sticking 30 adhered to the rear jacket 20 in a similar manner (step S2). Since the scraping part 20 of the scraping device 10d is also moved passed the centerline L of the width of the rear jacket 8 in the present step, there would be no matte-sticking 30 left unscraped. The bottom scraping devices 10a, 10d are operated first to facilitate the scraping of the matte-sticking adhered to the higher section since the matte-sticking at the higher section tends to fall off under its own weight by removing the matte-sticking below.

Next, one of the left or right side of the scraping devices 10b, 10e at one level above the scraping devices 10a, 10d, for instance the scraping device 10b at the right hand side is operated to scrape off the matte-sticking 30 in a similar manner (step S3). Then the scraping device 10e at the opposite side is operated to scrape off the matte-sticking 30 (step S4). Further, one of the right or left side of the scraping devices 10c, 10f at the top level, for instance the scraping device 10c at the right hand side is operated to scrape of the matte-sticking 30 in a similar manner (step S5), and the scraping device 10f at the opposite side at the top level is operated to scrape off the matte-sticking 30 in a similar manner and the operation is completed (step S6). The matte-sticking 30 removed by the matte-sticking removing apparatus 10 which is comprised by the scraping devices 10a~10f is dropped to the very bottom floor below the level where the converter 1 is installed, and recovered by a recovering means such as shovel loader and conveyor (not illustrated) (step S7). It is preferable to operate the apparatus 10 once in about every 5 hours of the daily time schedule of the converter operation.

Although the preferred embodiment of the present invention is explained hereinabove, the present invention is not to be limited to the particular embodiment as mentioned and wide range of modification and variation is possible within the scope of invention limited by the appended claims.

What is claimed is:

1. An apparatus for removing matte-sticking by scraping off matte-sticking adhered to an inner surface of an inclined rear jacket of an exhaust gas hood for collecting exhaust gas discharged from a converter of a smelting furnace, said apparatus having scraping means arranged in pairs, each of said scraping means provided with a scraping part for scraping off matte-sticking by moving said scraping part slidably across the inner surface of said rear jacket by a driving means from a sidewall of said exhaust gas hood to at least over a centerline of a width of said rear jacket, said scraping means being arranged in pairs at right and left sidewalls of said exhaust gas hood in multiple levels along an inclination of said rear jacket, thereby allowing the matte-sticking adhered to said rear jacket to be removed over almost its entire surface.

2. The apparatus for removing matte-sticking according to claim 1, wherein each of said scraping means is comprised of a shaft connected to said driving means and said scraping part provided to one end of said shaft, said scraping part being formed in the shape of a shovel with a backboard retained to said shaft, a base plate arranged so as to protrude forward from said backboard and one or more auxiliary plates arranged diagonally in between said backboard and base plate, said base plate being provided with indentations on its lower surface.

3. A method for using the apparatus for removing matte-sticking of claim 1 comprising the steps of:
- moving the scraping means at a right or left side of the pair located at a bottom level along the inclination of the rear jacket by said driving means from an original position of the sidewall of said exhaust gas hood to at least over the centerline of the width of said rear jacket to scrape off matte-sticking adhered to the inner surface of said rear jacket, and returning said scraping means to the original position thereafter;
- operating the opposite side of the pair of the scraping means moved in the preceding step by said driving means to scrape off said matte-sticking; and
- operating the scraping means at a right or left side of a pair arranged at one level above the bottom level of the rear jacket followed by operating the opposite side of the pair of said scraping means positioned at one level above the bottom level of the rear jacket by said driving means thereafter and repeating the above steps until said scraping means at a top level of the rear jacket is operated to scrape off said matte-sticking adhered to the inner surface of said rear jacket.

4. The method for using the apparatus for removing matte-sticking according to claim 3, wherein scraped matte-sticking is dropped to a bottom floor of said jacket, and the dropped matte-sticking is recovered.

* * * * *